United States Patent
Ghim et al.

(10) Patent No.: US 11,906,281 B2
(45) Date of Patent: Feb. 20, 2024

(54) DEVICE AND METHOD FOR MEASURING THICKNESS AND REFRACTIVE INDEX OF MULTILAYER THIN FILM BY USING ANGLE-RESOLVED SPECTRAL REFLECTOMETRY

(71) Applicant: Korea Research Institute of Standards and Science, Daejeon (KR)

(72) Inventors: Young-sik Ghim, Sejong (KR); Hyug-gyo Rhee, Daejeon (KR)

(73) Assignee: Korea Research Institute of Standards and Science (KR)

( * ) Notice: Subject to any disclaimer, the term of this patent is extended or adjusted under 35 U.S.C. 154(b) by 586 days.

(21) Appl. No.: 16/610,692

(22) PCT Filed: Jan. 26, 2018

(86) PCT No.: PCT/KR2018/001183
§ 371 (c)(1),
(2) Date: Jul. 8, 2021

(87) PCT Pub. No.: WO2019/031667
PCT Pub. Date: Feb. 14, 2019

(65) Prior Publication Data
US 2021/0341283 A1 Nov. 4, 2021

(30) Foreign Application Priority Data
Aug. 7, 2017 (KR) .......................... 10-2017-0099787

(51) Int. Cl.
*G01B 11/06* (2006.01)
*G01B 9/02* (2022.01)
(Continued)

(52) U.S. Cl.
CPC ...... *G01B 11/0675* (2013.01); *G01B 9/02044* (2013.01); *G01N 21/55* (2013.01); *G02B 27/14* (2013.01); *G01B 2290/70* (2013.01)

(58) Field of Classification Search
CPC ............ G01B 11/0675; G01B 9/02044; G01B 2290/70; G01B 11/0641; G01B 11/0616;
(Continued)

(56) References Cited

U.S. PATENT DOCUMENTS 7,277,172 B2    10/2007   Kandel et al.
2005/0237537 A1*  10/2005  Leizerson ............... G01B 9/02
                                                  356/504
(Continued)

FOREIGN PATENT DOCUMENTS

JP    09196630 A   *  7/1997
JP    2001-007173 A    1/2001
(Continued)

OTHER PUBLICATIONS

International Search Report dated May 31, 2018 in connection with PCT Application No. PCT/KR2018/001183.

*Primary Examiner* — Hwa Andrew Lee
(74) *Attorney, Agent, or Firm* — Akerman LLP (57) ABSTRACT

The present disclosure relates to an apparatus and method for measuring the thickness and refractive index of a multilayer thin film by measuring angle-resolved spectral reflectance according to light polarization. According to an exemplary embodiment of the present disclosure, the apparatus and method for measuring the thickness and refractive index of a multilayer structure using angle-resolved spectroscopic reflectometry is capable of measuring and analyzing thickness and refractive index of each layer of a structure having a multilayer thin film through an s-polarized imaging and a p-polarized imaging of the reflective light located in a back
(Continued)

focal plane of an objective lens which are acquired through an angle-resolved spectral imaging acquisition part.

2 Claims, 8 Drawing Sheets

(51) Int. Cl.
    *G01N 21/55*     (2014.01)
    *G02B 27/14*     (2006.01)

(58) Field of Classification Search
    CPC .. G01N 21/55; G01N 2021/213; G01N 21/21; G02B 27/14; G02B 27/145; G02B 27/283; G02B 27/28; G01J 3/02; G06T 7/60
    See application file for complete search history.

(56) References Cited

U.S. PATENT DOCUMENTS

| | | | | |
|---|---|---|---|---|
| 2008/0278713 | A1* | 11/2008 | Backman | G01N 21/49 356/128 |
| 2018/0120714 | A1* | 5/2018 | Zijp | G03F 7/70641 |
| 2019/0101373 | A1* | 4/2019 | Ghim | G01B 9/02015 |

FOREIGN PATENT DOCUMENTS

| | | |
|---|---|---|
| JP | 2004-177133 A | 6/2004 |
| JP | 3794745 B2 | 7/2006 |
| KR | 10-2013-0084718 A | 7/2013 |

* cited by examiner

d: Effective Radius of Objective Lens
r: Length from Center of Objective Lens to Beam Incidence Point
f: Focal Length of Objective Lens
$\Theta_0$ : Maximum Incidence Angle of Objective Lens
$\Theta$ : Beam Incidence Angle

DEVICE AND METHOD FOR MEASURING THICKNESS AND REFRACTIVE INDEX OF MULTILAYER THIN FILM BY USING ANGLE-RESOLVED SPECTRAL REFLECTOMETRY

TECHNICAL FIELD

The present disclosure relates to an apparatus and method for measuring the thickness and refractive index of multilayer thin films by measuring angle-resolved spectral reflectance according to the polarization of light.

DESCRIPTION OF THE RELATED ART

Figure 1:
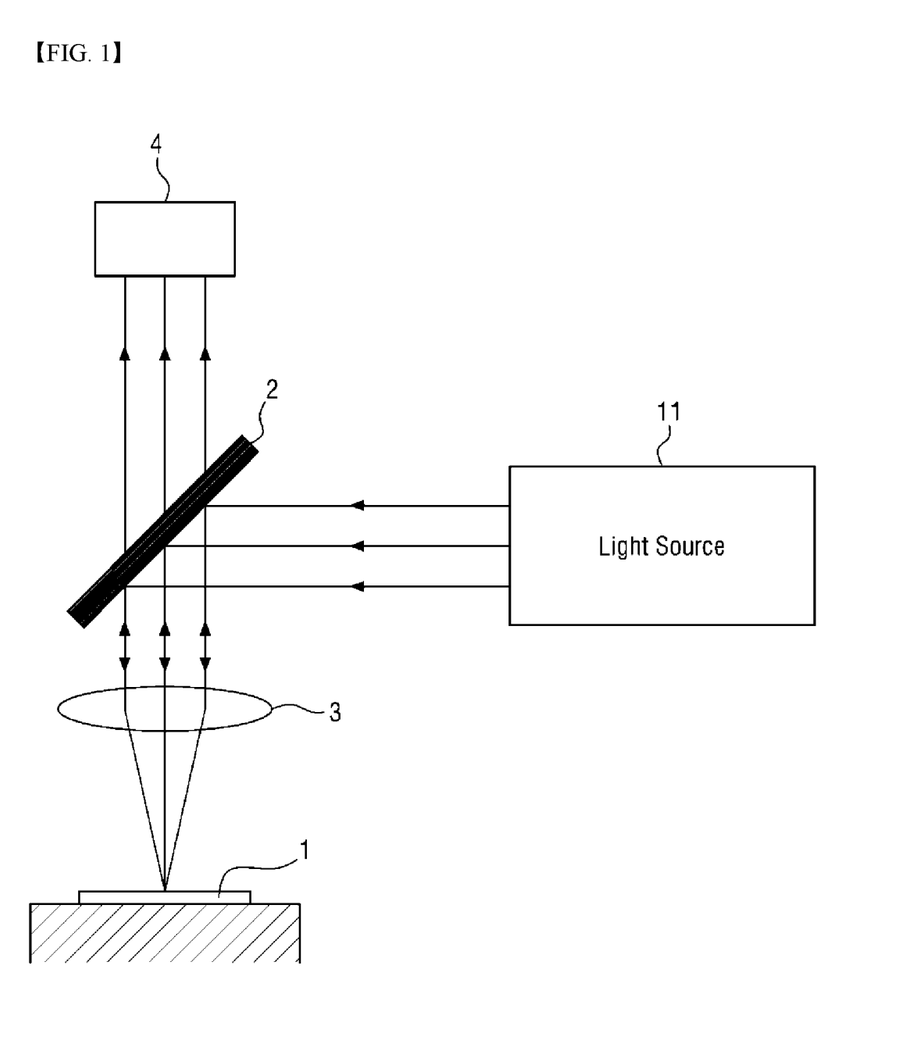
FIG. 1 is a block diagram showing a basic structure of a conventional reflectometer for measuring the thickness of a thin film.

The reflectometry has been used for measuring the thickness of a thin film. FIG. 1 is a block diagram showing the basic structure of a conventional reflectometer for measuring the thickness of a thin film.

As shown in FIG. 1, the conventional reflectometer for measuring the thickness of a thin film may be configured to include a light source (11), a beam splitter (2), a condenser lens (3), a detector (4) etc. The light source (11) emits light, the emitted light is split in a ratio of 50:50 by the beam splitter (2), and reflective light in the split light is condensed through the condenser lens (3), followed by being irradiated to a measurement object (1).

The irradiated light is divided into light to be reflected in an upper layer of the measurement object (1) and light to be reflected in a lower layer thereof, and the detector (4) measures and analyzes such a phase difference, allowing measuring the thickness of the thin film.

In addition, methods for measuring the thickness of a thin film are still being actively studied. Particularly, with respect to studies on beam profile reflectometry, Allan Rosencwaig et al. had measured the thickness and refractive index of thin film specimens of various thicknesses ranging from 3 nm to 2 μm in 1992 (Allan Rosencwaig, Jon Opsal, D L Willenborg, S M Kelso, and J T Fanton, Beam profile reflectometry: A new technique for dielectric film measurements, Applied Physics Letters, Vol. 60, No. 11, pp. 1301-1303). After this, a study result on the enhanced measurement performance was reported by Qiwen Zhan in 2002 (Qiwen Zhan and James R Leger, Microellipsometer with radial symmetry, Applied Optics, Vol. 41, No. 22, pp. 4630–4637).

Figure 2:
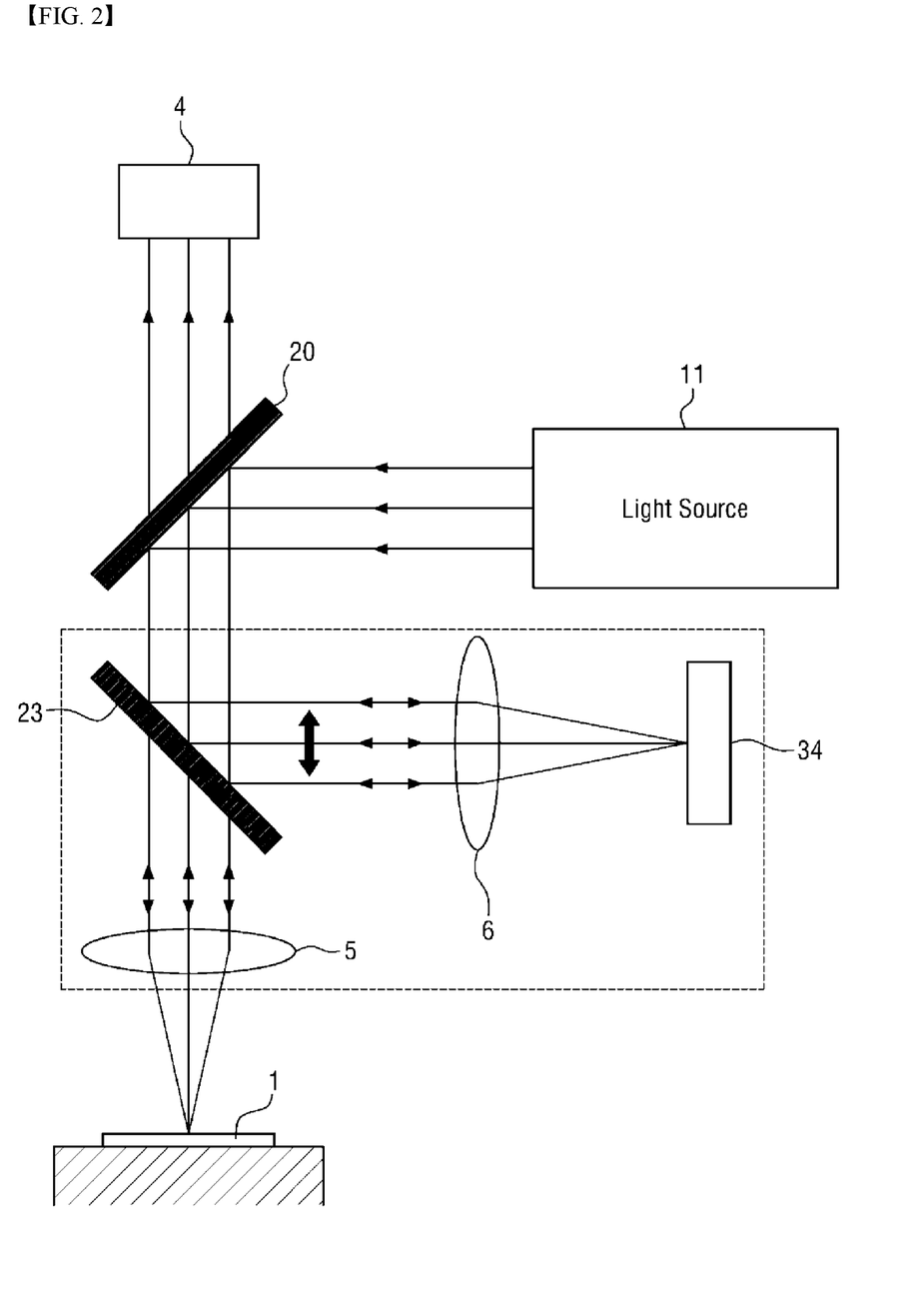
FIG. 2 is a block diagram showing an apparatus for measuring the thickness of a thin film using principle of an interferometer.

FIG. 2 is a block diagram showing an apparatus for measuring the thickness of a thin film based on the principle of an interferometer. As shown in FIG. 2, the apparatus for measuring the thickness of a thin film based on the principle of an interferometer may include a light source (11), a first beam splitter (20), a second beam splitter (23), a first condenser lens (5), a second condenser lens (6), a reference mirror (34), a detector (4) etc.

According to the apparatus shown in FIG. 2, part of light emitted from a light source (11) is reflected by a first beam splitter (20) and the remaining light is transmitted. Light reflected by the first beam splitter (20) is incident on a second beam splitter (23). Light reflected by the second beam splitter (23) is transmitted through a second condenser lens (6) and then reflected by the reference mirror (34), followed by being reflected in the second beam splitter (23) and incident on a detector (4) as a second reflective light. On the other hand, the light transmitted through the second beam splitter (23) is transmitted through a first condenser lens (5) and reflected to a measurement object (1), followed by being incident on the detector (4) as a first reflective light. That is, interference light of the first reflective light and the second reflective light is incident on the detector (4). This interference light includes thickness information for the thin film.

Figure 3:
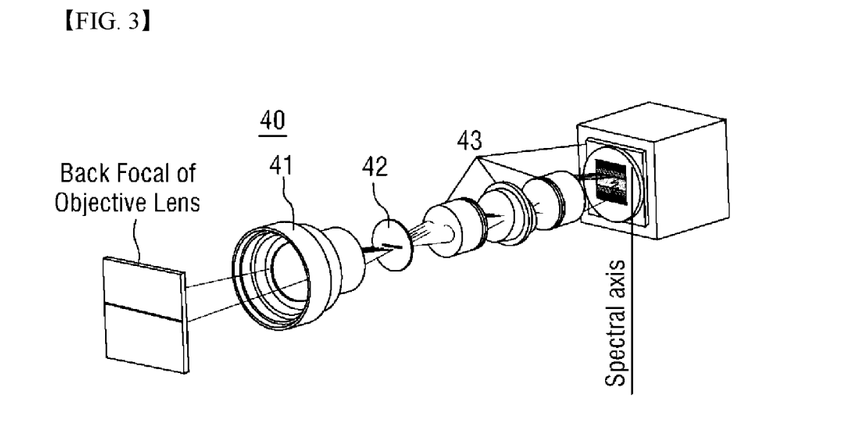
FIG. 3 is a perspective view of a detector composed of an angle-resolved spectral imaging acquisition part.

FIG. 3 is a perspective view showing a detector composed of an angle-resolved spectral imaging acquisition parl. An angle-resolved spectral imaging acquisition part (40) shown in FIG. 3 may analyze light intensity distribution by wavelength for one line in a back focal plane of an objective lens. That is, as shown in FIG. 3, the angle-resolved spectral imaging acquisition part (40) includes an imaging optical system (41), a slit (42) and an imaging spectroscope (43) and corresponds to an apparatus which obtains only an imaging of the one line in the back focal plane of the objective lens and allows spectrometry thereof by wavelength through diffractive optics, thereby consequently obtaining several hundreds of consecutive spectra bands. Theses angle-resolved spectral imaging acquisition part allows measuring and analyzing the thickness of the thin film.

DESCRIPTION OF THE INVENTION

Technical Problems to be Solved

Therefore, in order to solve the aforesaid drawbacks of the related arts, the present disclosure is directed to providing an apparatus and method for measuring the thickness and refractive index of a multilayer thin film using angle-resolved spectroscopic reflectometry, which is capable of measuring and analyzing the thickness and refractive index of each layer of the structure having a multilayer thin film through an s-polarized imaging and a p-polarized imaging of the reflective light located in a back focal plane of an objective lens acquired through an angle-resolved spectral imaging acquisition part.

Further, the present disclosure is directed to providing an apparatus and method for measuring the thickness and refractive index of a multilayer thin film using angle-resolved spectroscopic reflectometry, which use one angle-resolved spectral imaging acquisition part but acquire both the s-polarized imaging and the p-polarized imaging by changing an angle of rotation of an image-rotating prism, allowing measuring and analyzing the thickness and refractive index of each layer of the structure having a multilayer thin film.

In the meantime, technical problems to be solved in the present disclosure are not limited to the aforementioned problems, and other technical problems, which are not mentioned above, may be clearly understood from the following description by those skilled in the art to which the present disclosure pertains.

Technical Solution

According to the first aspect of the present disclosure, in an apparatus for measuring the thickness and refractive index of measurement object coated with a multilayer thin film, the apparatus for measuring the thickness and refractive index of a multilayer structure using angle-resolved spectroscopic reflectometry may include: an illuminant optical module having a light source which emits light; a first beam splitter reflecting part of the light which is emitted from the illuminant optical module; an objective lens allowing light which is reflected in the first beam splitter to be incident on the measurement object; a second beam splitter allowing reflective light of the light incident on the measurement object, to be incident, followed by reflecting part of the incident light and transmitting the remaining light; a first angle-resolved spectral imaging acquisition part allowing reflective light of the light reflected in the second beam splitter to be incident and first polarizing the reflective light located in a back focal plane of the objective lens, so as to acquire a first polarized angle-resolved spectral imaging; and a second angle-resolved spectral imaging acquisition part allowing reflective light of the light transmitted in the second beam slitter to be incident and second polarizing the reflective light located in the back focal plane of the objective lens, so as to acquire a second polarized angle-resolved spectral imaging.

According to another aspect of the present disclosure, the apparatus for measuring the thickness and refractive index of a multilayer structure using angle-resolved spectroscopic reflectometry may further include: an analysis means measuring and analyzing thickness and refractive index of the measurement object from the first polarized angle-resolved spectral imaging which is acquired from the first angle-resolved spectral imaging acquisition part, and the second polarized angle-resolved spectral imaging which is acquired from the second angle-resolved spectral imaging acquisition part.

According to another aspect of the present disclosure, the illuminant optical module may include: a broad band light source emitting light; and an illuminant optical system emitting light having an even light intensity distribution through the objective lens from light which is emitted from the broad band light source.

According to another aspect of the present disclosure, the apparatus for measuring the thickness and refractive index of a multilayer structure using angle-resolved spectroscopic reflectometry may further include a linear polarizer provided between the illuminant optical system and the first beam splitter.

According to another aspect of the present disclosure, the first angle-resolved spectral imaging acquisition part may include: a first imaging optical system imaging, to a first slit, the reflective light reflected in the second beam splitter and located in the back focal plane of the objective lens; the first slit transmitting only first polarized light in the reflective light in the back focal plane in the first imaging optical system; and a first imaging spectrometer acquiring a first angle-resolved spectral imaging, and the second angle-resolved spectral imaging acquisition part may include: a second imaging optical system imaging, to a second slit, the reflective light transmitted in the second beam splitter and located in the back focal plane of the objective lens; the second slit transmitting only second polarized light in the reflective light on the back focal plane in the second imaging optical system; and a second imaging spectrometer acquiring a second angle-resolved spectral imaging.

According to another aspect of the present disclosure, the analysis means may compare and analyze an angle-resolved spectral imaging reflected in a measurement object according to a polarization state.

According to the second aspect of the present disclosure, in a method for measuring a thickness and refractive index of measurement object coated with a multilayer thin film, the method for measuring the thickness and refractive index of a multilayer structure using angle-resolved spectroscopic reflectometry may include steps of: the method for measuring the thickness and refractive index of a multilayer structure using angle-resolved spectroscopic reflectometry comprises steps of: emitting light from a broad band light source of an illuminant optical module; reflecting part of the light emitted from the illuminant optical module by a first beam splitter; allowing the light reflected in the first beam splitter to be incident on the measurement object composed of a multilayer thin film through an objective lens; allowing reflective light of the light incident on the measurement object, to be incident on a second beam splitter, followed by reflecting part thereof and transmitting the remaining light; allowing the reflective light reflected in the second beam splitter to be incident on a first angle-resolved spectral imaging acquisition part and first-polarizing the reflective light in the first angle-resolved spectral imaging acquisition part, allowing acquiring a first polarized angle-resolved spectral imaging, while the reflective light transmitted in the second beam splitter is incident on a second angle-resolved spectral imaging acquisition part and second-polarizing the reflective light in the second angle-resolved spectral imaging acquisition part, allowing acquiring a second polarized angle-resolved spectral imaging; and analyzing thickness and refractive index of the measurement object by an analysis means from a first polarized angle-resolved spectral imaging which is acquired from the first angle-resolved spectral imaging acquisition part and a second polarized angle-resolved spectral imaging which is acquired from the second angle-resolved spectral imaging acquisition part.

According to the third aspect of the present disclosure, in an apparatus for measuring a thickness and refractive index of measurement object coated with a multilayer thin film, the apparatus for measuring the thickness and refractive index of a multilayer structure using angle-resolved spectroscopic reflectometry may include: the apparatus for measuring the thickness and refractive index of a multilayer structure using angle-resolved spectroscopic reflectometry comprises: an illuminant optical module having a light source which emits a light; a first beam splitter reflecting part of the light which is emitted from the illuminant optical module; an objective lens allowing the light which is reflected in the first beam splitter to be incident on the measurement object; a second beam splitter allowing reflective light of the light incident on the measurement object, to be incident, followed by reflecting part of the incident light and transmitting the remaining light; a third beam splitter reflecting part of the reflective light of the light which is incident on the measurement object; an imaging acquisition part allowing the reflective light reflected in the third beam splitter to be incident, so as to acquire an imaging of the measurement object; a first angle-resolved spectral imaging acquisition part allowing reflective light of the light reflected in the second beam splitter to be incident and first polarizing the reflective light located in a back focal plane of the objective lens, so as to acquire a first polarized angle-resolved spectral imaging; and a second angle-resolved spectral imaging acquisition part allowing reflective light of the light transmitted in the second beam splitter to be incident and second polarizing the reflective light located in the back focal plane of the objective lens, so as to acquire a second polarized angle-resolved spectral imaging.

According to another aspect of the present disclosure, the apparatus for measuring the thickness and refractive index of a multilayer structure using angle-resolved spectroscopic reflectometry may further include: an analysis means measuring and analyzing thickness and refractive index of the measurement object from the imaging of the measurement object which is acquired from the imaging acquisition part, the first polarized angle-resolved spectral imaging which is acquired from the first angle-resolved spectral imaging acquisition part, and the second polarized angle-resolved spectral imaging which is acquired from the second angle-resolved spectral imaging acquisition part.

According to another aspect of the present disclosure, in the apparatus for measuring the thickness and refractive index of a multilayer structure using angle-resolved spectroscopic reflectometry, the imaging acquisition part may include a tube lens imaging the reflective light reflected in the third beam splitter, and CCM or CMOS allowing an imaging transmitted through the tube lens to be incident, so as to acquire an imaging of the measurement object.

According to the fourth aspect of the present disclosure, in a method for measuring a thickness and refractive index of measurement object coated with a multilayer thin film, the method for measuring the thickness and refractive index of a multilayer structure using angle-resolved spectroscopic reflectometry may include steps of: emitting light from a broad band light source of an illuminant optical module; reflecting part of the light which is emitted from the illuminant optical module by a first beam splitter; allowing the light reflected in the first beam splitter to be incident on the measurement object composed of a multilayer thin film through an objective lens; reflecting part of the reflective light of the light incident on the measurement object by the third beam splitter, followed by allowing a reflective light reflected in the third beam splitter to be incident on an imaging acquisition part, so as to acquire an imaging of the measurement object; allowing reflective light of the light incident on the measurement object, to be incident on a second beam splitter, followed by reflecting part thereof and transmitting the remaining light; allowing the reflective light reflected in the second beam splitter to be incident on a first angle-resolved spectral imaging acquisition part and first-polarizing the reflective light in the first angle-resolved spectral imaging acquisition part, allowing acquiring a first polarized angle-resolved spectral imaging, while the reflective light transmitted in the second beam splitter is incident on a second angle-resolved spectral imaging acquisition part and second-polarizing the reflective light in the second angle-resolved spectral imaging acquisition part, allowing acquiring a second polarized angle-resolved spectral imaging; and analyzing thickness and refractive index of the measurement object by an analysis means from an imaging of the measurement object which is acquired from the imaging acquisition part, a first polarized angle-resolved spectral imaging which is acquired from the first angle-resolved spectral imaging acquisition part and a second polarized angle-resolved spectral imaging which is acquired from the second angle-resolved spectral imaging acquisition part.

According to the fifth aspect of the present disclosure, in an apparatus for measuring a thickness and refractive index of measurement object coated with a multilayer thin film, the apparatus for measuring the thickness and refractive index of a multilayer structure using angle-resolved spectroscopic reflectometry may include: an illuminant optical module having a light source which emits light; a first beam splitter reflecting part of the light which is emitted from the illuminant optical module; an objective lens allowing the light which is reflected in the first beam splitter to be incident on the measurement object; a third beam splitter reflecting part of the reflective light of the light which is incident on the measurement object; an imaging acquisition part allowing the reflective light reflected in the third beam splitter to be incident, so as to acquire an imaging of the measurement object; an image-rotating prism allowing the reflective light transmitted through the third beam splitter to be incident and rotating about an optical axis, so as to rotate the reflective light; and an angle-resolved spectral imaging acquisition part polarizing the reflective light transmitted through the image-rotating prism in the back focal plane of the objective lens.

According to another aspect of the present disclosure, the image-rotating prism emits an output reflective light which is rotated $2\theta$ degrees from an input reflective light according to rotating thereof $\theta$ degrees about an optical axis.

According to another aspect of the present disclosure, the angle-resolved spectral imaging acquisition part acquires a first polarized angle-resolved spectral imaging or a second polarized angle-resolved spectral imaging according to an angle of rotation of the image-rotating prism, and the apparatus further comprises an analysis means measuring and analyzing thickness and refractive index of the measurement object from the imaging acquired from the imaging acquisition part, the first polarized angle-resolved spectral imaging acquired from the first angle-resolved spectral imaging acquisition part and the second polarized angle-resolved spectral imaging acquired from the second angle-resolved spectral imaging acquisition part.

According to the sixth aspect of the present disclosure, in a method for measuring a thickness and refractive index of measurement object coated with a multilayer thin film using the apparatus according the fifth aspect of the present disclosure, the method for measuring the thickness and refractive index of a multilayer structure using angle-resolved spectroscopic reflectometry may include steps of: the method for measuring the thickness and refractive index of a multilayer structure using angle-resolved spectroscopic reflectometry comprises steps of: emitting light from a broad band light source of an illuminant optical module; reflecting part of the light which is emitted from the illuminant optical module by a first beam splitter; allowing the light reflected in the first beam splitter to be incident on the measurement object composed of a multilayer thin film through an objective lens; reflecting part of the reflective light of the light incident on the measurement object by a third beam splitter, followed by allowing a reflective light reflected in the third beam splitter to be incident on an imaging acquisition part, so as to acquire an imaging of the measurement object; allowing a reflective light transmitted through the third beam splitter to be incident on an image-rotating prism, followed by rotating an input reflective light according to rotation of the image-rotating prism about an optical axis, so as to emit an output reflective light; and acquiring a polarized angle-resolved spectral imaging by polarizing an output reflective light transmitted through the image-rotating prism by an angle-resolved spectral imaging acquisition part.

According to another aspect of the present disclosure, the angle-resolved spectral imaging acquisition part acquires a first polarized angle-resolved spectral imaging or a second polarized angle-resolved spectral imaging according to an angle of rotation of the image-rotating prism, and an analysis means measures and analyzes the thickness and refractive index of the measurement object from the imaging acquired from the imaging acquisition part, the first polarized angle-resolved spectral imaging and the second polarized angle-resolved spectral imaging acquired from the angle-resolved spectral imaging acquisition part.

Effects of the Invention

An apparatus and method for measuring the thickness and refractive index of a multilayer thin film using angle-resolved spectroscopic reflectometry according to an exemplary embodiment of the present disclosure are capable of measuring and analyzing the thickness and refractive index of each layer of a structure having a multilayer thin film through an s-polarized imaging and a p-polarized imaging of the reflective light located in a back focal plane of an objective lens which are acquired through an angle-resolved spectral imaging acquisition part.

Further, according to an exemplary embodiment of the present disclosure, an apparatus and method for measuring the thickness and refractive index of a multilayer thin film using angle-resolved spectroscopic reflectometry use one angle-resolved spectral imaging acquisition part but acquire both the s-polarized imaging and the p-polarized imaging by changing a rotation angle of an image-rotating prism, thereby measuring and analyzing the thickness and refractive index of each layer of the structure having the multilayer thin film.

In the meantime, effects of the invention are not limited to the aforementioned problems, and other effects, which are not mentioned above, may be clearly understood from the following description by those skilled in the art to which the present disclosure pertains.

BRIEF DESCRIPTION OF THE DRAWINGS

The following drawings attached to the present specification illustrate exemplary embodiments of the present disclosure and serve to further understand the technical spirit of the present disclosure together with the detailed description of the present disclosure, and the present disclosure should not be interpreted as being limited to the items illustrated in the drawings.

REFERENCE NUMERALS

1: a measurement object 2: a beam splitter 3: a condenser lens
4: a detector 5: a first condenser lens 6: a second condenser lens
10: an illuminant optical module 11: a light source 12: an illuminant optical system
13: linear optical polarizer 20: a first beam splitter 30: an objective lens
40: an angle-resolved spectral imaging acquisition part 41: an imaging optical system
42: a slit 43: an imaging spectrometer 45: an image-rotating prism
50: a second beam splitter 60: a first angle-resolved spectral imaging acquisition part
61: a first imaging optical system 62: a first slit 63: a first imaging spectrometer
70: a second angle-resolved spectral imaging acquisition part 71: a second imaging optical system
72: a second slit 73: a second imaging spectrometer 80: a third beam splitter
90: an imaging acquisition part 91: a tube lens
92: CCD or CMOS of an imaging acquisition part
100: an apparatus for measuring the thickness and refractive index of a multilayer structure using angle-resolved spectroscopic reflectometry

DETAILED DESCRIPTION OF THE PREFERRED EMBODIMENTS

Figure 4:
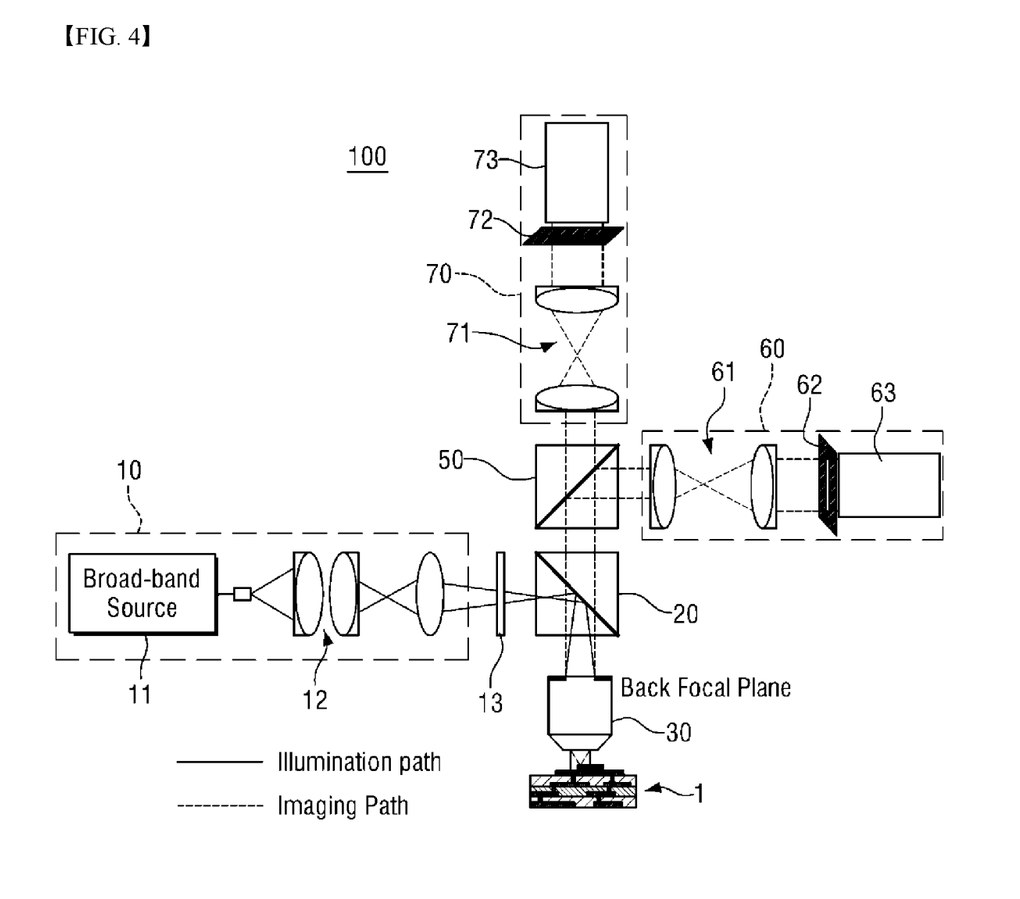
FIG. 4 is a block diagram of an apparatus for measuring the thickness and refractive index of a multilayer structure using angle-resolved spectroscopic reflectometry according to the first exemplary embodiment of the present disclosure.
Figure 5:
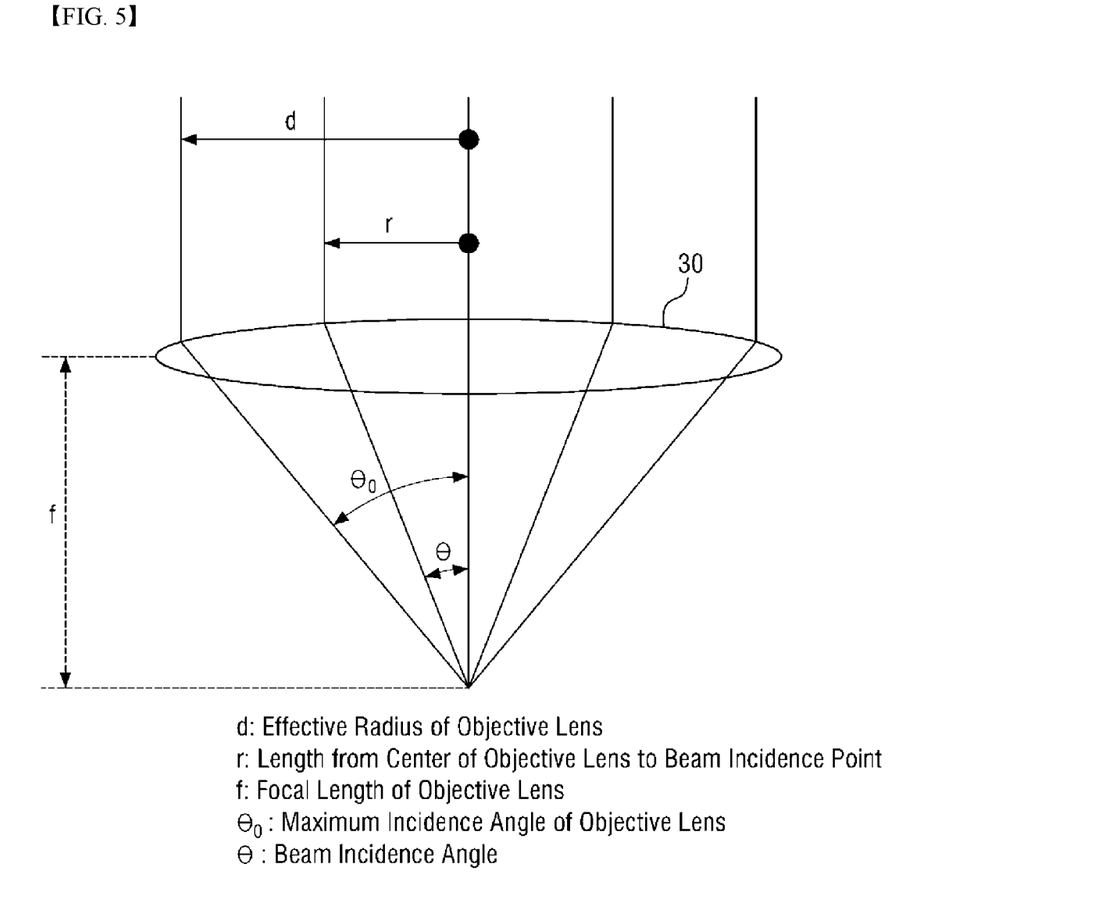
FIG. 5 is a side view showing an angle and a focus of a light transmitted through an objective lens of the apparatus for measuring the thickness and refractive index of a multilayer structure using angle-resolved spectroscopic reflectometry according to an exemplary embodiment of the present disclosure.
Figure 6:
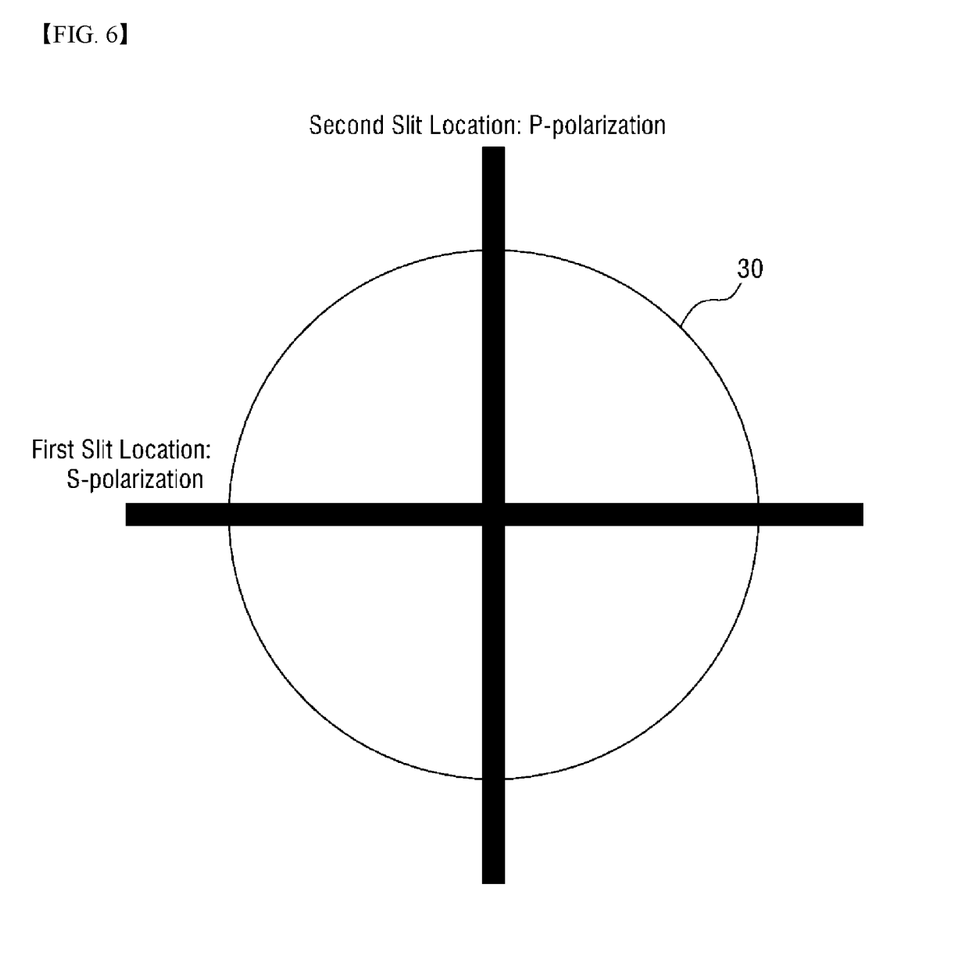
FIG. 6 is a plane view of FIG. 5.

Hereinafter, an apparatus (100) for measuring the thickness and refractive index of a multilayer structure using angle-resolved spectroscopic reflectometry according to the first exemplary embodiment of the present disclosure will be described. Firstly, configurations and functions of the apparatus (100) for measuring the thickness and refractive index of a multilayer structure using angle-resolved spectroscopic reflectometry and a method for measuring the same will be described. FIG. 4 is a block diagram of the apparatus (100) for measuring the thickness and refractive index of a multilayer structure using angle-resolved spectroscopic reflectometry according to the first exemplary embodiment of the present disclosure. FIG. 5 is a side view showing an angle and a focus of a light transmitted through an objective lens (30) of the apparatus (100) for measuring the thickness and refractive index of a multilayer structure using angle-resolved spectroscopic reflectometry according to an exemplary embodiment of the present disclosure. FIG. 6 is a plane view of FIG. 5.

as shown in FIG. 4, an apparatus for measuring the thickness and refractive index of a measurement object (1) coated with a multilayer thin film according to the first exemplary embodiment of the present disclosure is configured to include an illuminant optical module (10), a first beam splitter (20), an objective lens (30), a second beam splitter (50), a first angle-resolved spectral imaging acquisition part (60), a second angle-resolved spectral imaging acquisition part (70), etc.

The illuminant optical module (10) is configured to include a broad band light source (11) emitting light and an illuminant optical system (12) emitting light having an even light intensity distribution through the objective lens from light which is emitted from the broad band light source (11). As a specific exemplary embodiment of the present disclosure, the broad band light source (11) is configured to emit light having a wavelength range from 400 nm to 700 nm.

The first beam splitter (20) reflects part of the light which is emitted from the illuminant optical module (10), followed by being incident on the objective lens (30). Also, as shown in FIG. 4, a linear polarizer (13) is provided between the illuminant optical system (12) and the first beam splitter (20). A polarization direction of a beam incident on the objective lens (30) is controlled by using the linear polarizer (13), allowing passing each component of s-polarization and p-polarization through a first slit and a second slit, respectively.

The objective lens (30) having a high numerical aperture (NA) is applied to an exemplary embodiment of the present disclosure, wherein the NA of the objective lens should be as high as possible. The highest NA is 1 theoretically when using the objective lens at the atmosphere. For reference, the NA of the objective lens used in the experiment is 0.9. In this case, an incidence angle varies within a range from 0 degrees to 64 degrees.

Further, the light reflected in the first beam splitter (20) is incident on the measurement object (1) composed of a multilayer thin film through the objective lens (30). The light incident on the measurement object (1) composed of a multilayer thin film is reflected, followed by being transmitted through the first beam splitter (20).

And the reflective light of the light incident on the measurement object (1) is transmitted through the first beam splitter (20) and then incident on the second beam splitter. Part of the incident light is reflected and the remaining is transmitted.

Further, as shown in FIG. 4, the reflective light reflected in the second beam splitter (50) is incident on the first angle-resolved spectral imaging acquisition part (60), while the reflective light transmitted through the second beam splitter (50) is incident on the second angle-resolved spectral imaging acquisition part (70).

The first angle-resolved spectral imaging acquisition part (60) allows the reflective light reflected in the second beams splitter (50) to be incident, and first polarizes the reflective light located in a back focal plane of the objective lens (30), so as to acquire a first polarized angle-resolved spectral imaging. The first polarized angle-resolve spectral imaging may be an s-polarized imaging in the exemplary embodiment of the present disclosure. Meanwhile, the second angle-resolved spectral imaging acquisition part (70) allows the reflective light transmitted through the second beam splitter (50) to be incident and second polarizes the reflective light located in the back focal plane of the objective lens (30), so as to acquire a second polarized angle-resolved spectral imaging. The second polarized angle-resolve spectral imaging may be a p-polarized imaging in the exemplary embodiment of the present disclosure.

And an analysis means measures and analyzes the thickness and refractive index of the measurement object (1) from each of the s-polarized imaging and p-polarized imaging acquired from the first angle-resolved spectral imaging acquisition part (60) and the second angle-resolved spectral imaging acquisition part (70), respectively.

In addition, the first angle-resolved spectral imaging acquisition part (60) is configured to include a first imaging optical system (61) for imaging, to a first slit (62), the reflective light reflected in the second beam splitter (50), located in a back focal plane of the objective lens (30), the first slit (62) for transmitting only an s-polarized light in the reflective light in a back focal plane after being emitted in the first imaging optical system (61), and a first imaging spectrometer (63) for acquiring the s-polarized imaging.

Further, the second angle-resolved spectral imaging acquisition part (70) is configured to include a second imaging optical system (71) for imaging, to a second slit, the reflective light transmitted in the second beam splitter, located in a back focal plane of the objective lens (30), the second slit (72) for transmitting only a p-polarized light in the reflective light in the back focal plane after being emitted in the second imaging optical system (71), and a second imaging spectrometer (73) for acquiring the p-polarized imaging.

Detailed Description of the Embodiments

Figure 7:
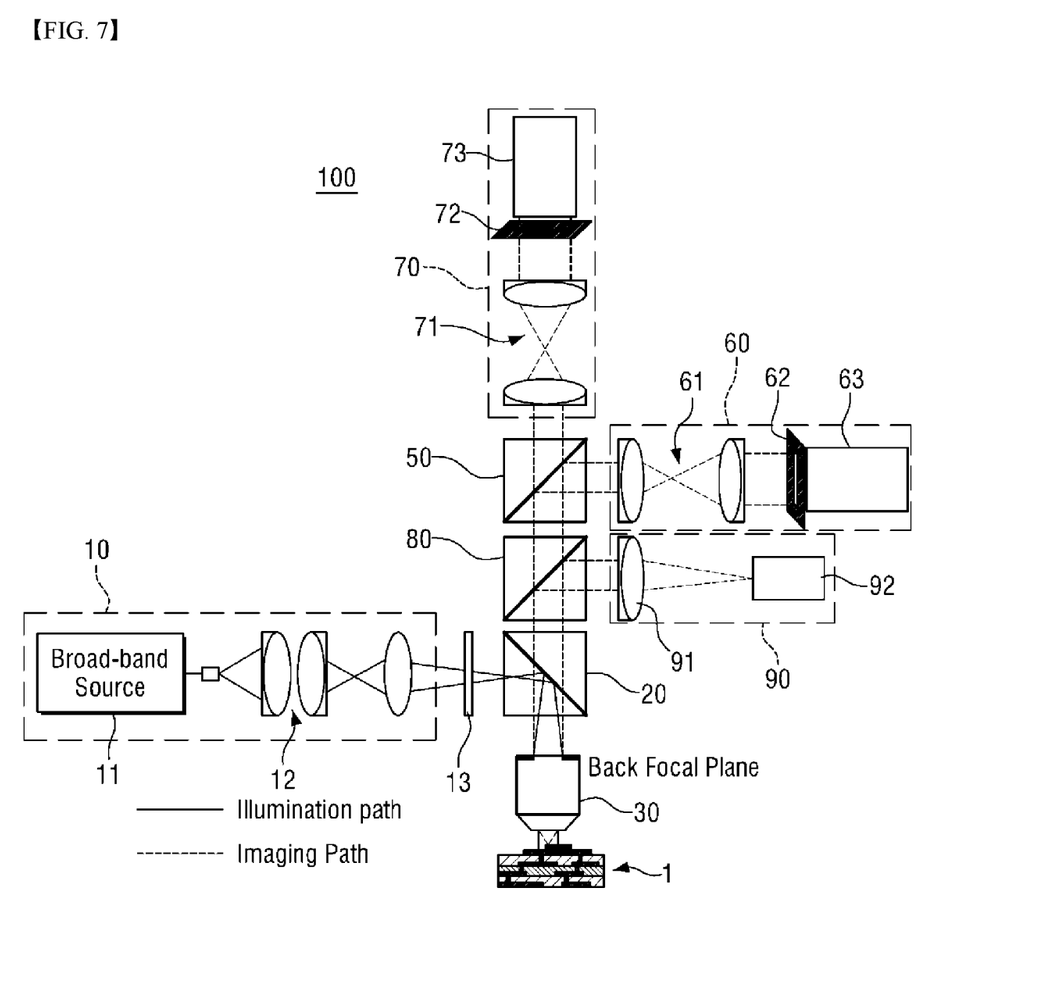
FIG. 7 is a block diagram of an apparatus for measuring the thickness and refractive index of a multilayer structure using angle-resolved spectroscopic reflectometry according to the second exemplary embodiment of the present disclosure.

FIG. 7 is a block diagram of an apparatus (100) for measuring the thickness and refractive index of a multilayer structure using angle-resolved spectroscopic reflectometry according to the second exemplary embodiment of the present disclosure. The apparatus (100) for measuring the thickness and refractive index of a multilayer structure using angle-resolved spectroscopic reflectometry according to the second exemplary embodiment of the present disclosure is configured to include configurations of the apparatus (100) according to the aforementioned first exemplary embodiment and it further includes an imaging acquisition part (90) acquiring an imaging of a measurement object (1).

That is, the apparatus (100) for measuring the thickness and refractive index of a multilayer structure using angle-resolved spectroscopic reflectometry according to the second exemplary embodiment of the present disclosure is configured to include an illuminant optical module (10) having a light source (11) which emits light, a first beam splitter (20) reflecting part of light which is emitted from the illuminant optical module (10), an objective lens allowing light which is reflected in the first beam splitter (20) to be incident on a measurement object (1) composed of a multilayer thin film.

Further, as like the first exemplary embodiment, it further includes a second beam splitter (50) allowing a reflective light of light incident on the measurement object (1) to be incident, followed by reflecting part of the incident light and transmitting the remaining.

As additionally shown in FIG. 7, the apparatus (100) for measuring the thickness and refractive index of a multilayer structure using angle-resolved spectroscopic reflectometry according to the second exemplary embodiment of the present disclosure is configured to further include a third beam splitter (80) reflecting part of the reflective light of the light incident on the measurement object (1) and an imaging acquisition part (90) allowing the reflective light reflected in the third beam splitter (80) to be incident, so as to acquire an imaging of the measurement.

This imaging acquisition part (90), as shown in FIG. 7, is configured to include a tube lens (91) imaging the reflective light reflected in the third beam splitter (80), and CCD or CMOS (92) allowing an imaging transmitted through the tube lens (91) to be incident, so as to acquire an imaging of the measurement object (1).

In addition, as like the first exemplary embodiment of the present disclosure, the reflective light reflected in the second beam splitter (50) is incident on a first angle-resolved spectral imaging acquisition part (60) and the first angle-resolved spectral imaging acquisition part (60) s-polarizes the reflective light located in a back focal plane of an objective lens (30), allowing acquiring an s-polarized imaging.

Further, the reflective light transmitted through the second beam splitter (50) is incident on a second angle-resolved spectral imaging acquisition part (70) and the second angle-resolved spectral imaging acquisition part (70) p-polarizes the reflective light located in the back focal plane of the objective lens (30), allowing acquiring a p-polarized imaging.

In addition, an analysis means measures and analyzes the thickness and refractive index of the measurement object from the imaging of the measurement object (1) acquired from the imaging acquisition part (90), the first polarized angle-resolved spectral imaging acquired from the first angle-resolved spectral imaging acquisition part (60) and the second polarized angle-resolved spectral imaging acquired from the second angle-resolved spectral imaging acquisition part (70).

Therefore, a method for measuring the thickness and refractive index of a multilayer structure using angle-resolved spectroscopic reflectometry according to the second exemplary embodiment of the present disclosure is as follows. Firstly, the broad band light source (11) of the illuminant optical module (10) emits light, part of the light emitted from the broad band light source (11) of the illuminant optical module (10) is reflected in the first beam splitter (20) and incident on the measurement object composed of a multilayer thin film through the objective lens (30).

In addition, part of the reflective light of the light incident on the measurement object (1) is reflected by the third beam splitter (80). The reflective light reflected in the third beam splitter (80) is incident on the imaging acquisition part (90), allowing acquiring an imaging of the measurement object (1).

Further, the reflective light of the light incident on the measurement object (1) is incident on the second beam splitter (50), followed by reflecting part the incident light and transmitting the remaining.

The reflective light reflected in the second beam splitter (50) is incident on the first angle-resolved spectral imaging acquisition part (60). The reflective light in the back focal plane of the objective lens (30) is s-polarized in the first angle-resolved spectral imaging acquisition part (60), allowing acquiring an s-polarized imaging. The reflective light reflected in the second beam splitter (50) is incident on the second angle-resolved spectral imaging acquisition part (70). The reflective light in the back focal plane of the objective lens (30) is p-polarized in the second angle-resolved spectral imaging acquisition part (70), allowing acquiring a p-polarized imaging.

In addition, the analysis means measures and analyzes the thickness and refractive index of the measurement object (1) from the imaging acquired from the imaging acquisition part (90), the s-polarized imaging acquired from the first angle-resolved spectral imaging acquisition part (60) and the p-polarized imaging acquired from the second angle-resolved spectral imaging acquisition part (70).

Figure 8:
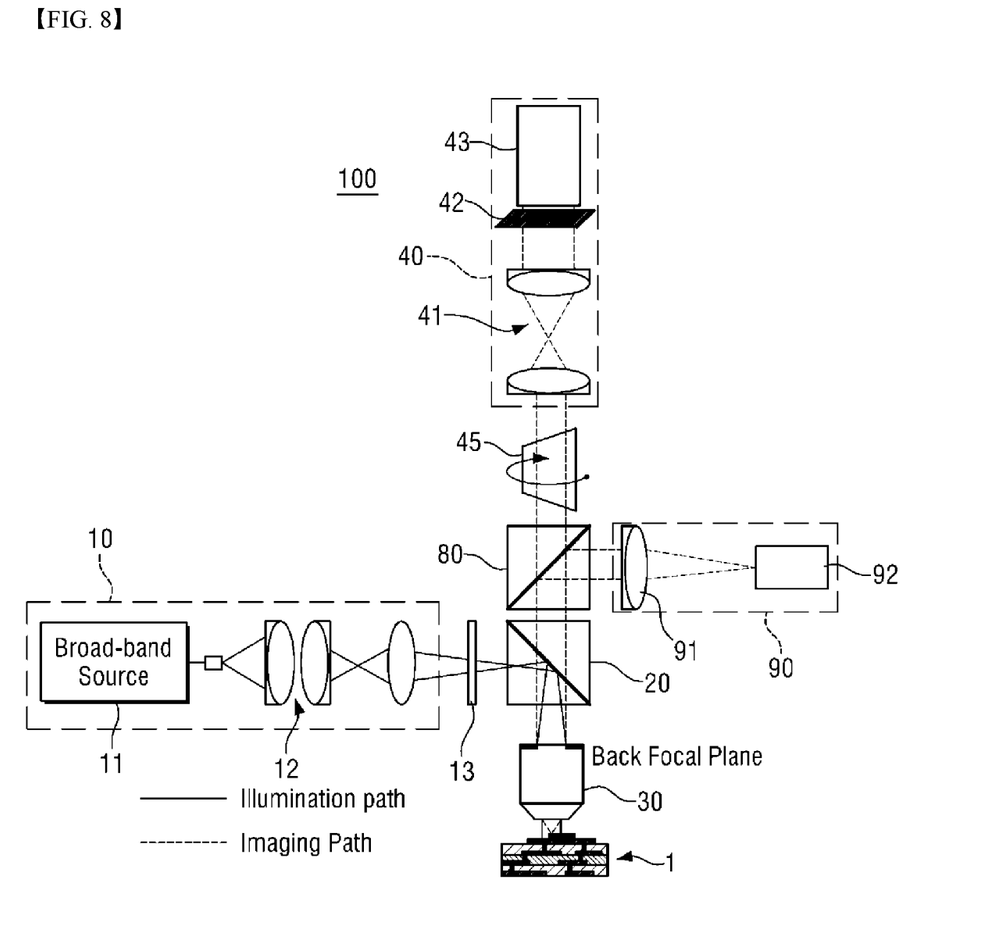
FIG. 8 is a block diagram of an apparatus for measuring the thickness and refractive index of a multilayer structure using angle-resolved spectroscopic reflectometry according to the third exemplary embodiment of the present disclosure.
Figure 9:
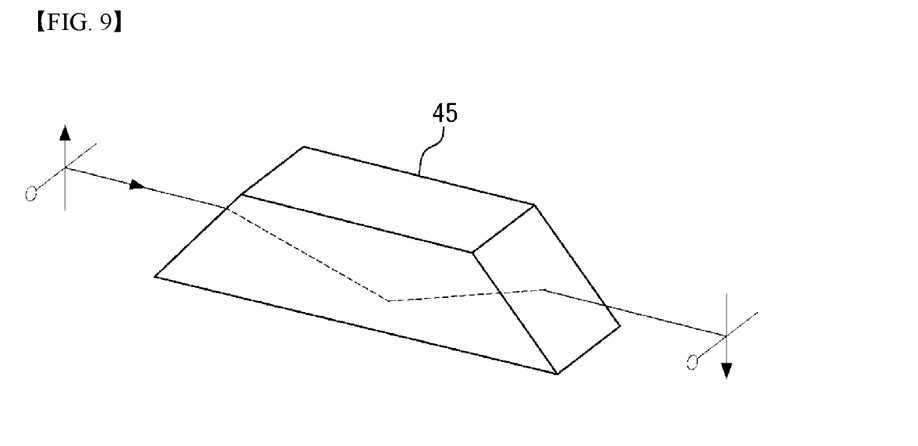
FIG. 9 is a perspective view of an image-rotating prism of which an angle of rotation is 0 degrees, according to the third exemplary embodiment of the present disclosure.
Figure 10:
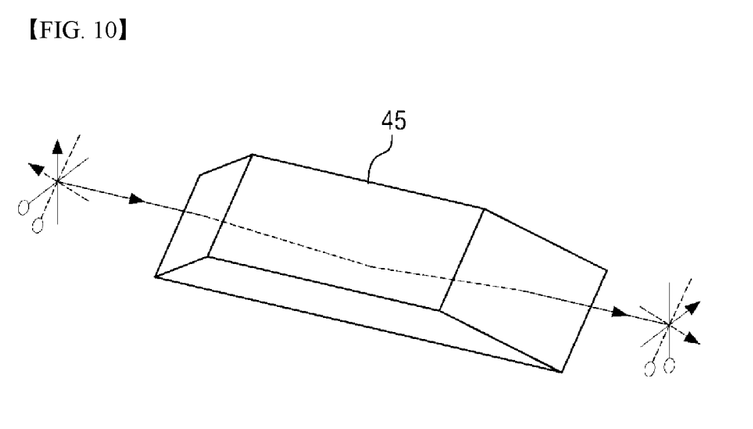
FIG. 10 is a perspective view of an image-rotating prism of which an angle of rotation is 45 degrees, according to the third exemplary embodiment of the present disclosure.

FIG. 8 is a block diagram of an apparatus (100) for measuring the thickness and refractive index of a multilayer structure using angle-resolved spectroscopic reflectometry according to the third exemplary embodiment of the present disclosure. FIG. 9 is a perspective view of an image-rotating prism (45) of which an angle of rotation is 0 degrees, according to the third exemplary embodiment of the present disclosure. FIG. 10 is a perspective view of the image-rotating prism (45) of which an angle of rotation is 45 degrees, according to the third exemplary embodiment of the present disclosure.

As like the aforementioned first and second exemplary embodiments, the apparatus (100) for measuring the thickness and refractive index of a multilayer structure using angle-resolved spectroscopic reflectometry according to the third exemplary embodiment of the present disclosure is configured to include an illuminant optical module (10) having a light source (11) which emits light, a first beam splitter (20) reflecting part of light which is emitted from the illuminant optical module (10), an objective lens allowing light which is reflected in the first beam splitter (20) to be incident on a measurement object (1) composed of a multilayer thin film. Further, a polarization direction of a beam incident on the objective lens (30) is controlled by using a linear polarizer (13), allowing passing a component of s-polarization through a slit before rotating the image-rotating prism (45) and passing a component of p-polarization through the slit after rotating the image-rotating prism (45) 45 degrees.

Further, as like the aforementioned second exemplary embodiment of the present disclosure, a third beam splitter (80) reflects part of a reflective light of light incident on the measurement object (1). The reflective light reflected in the third beam splitter (80) is incident on an imaging acquisition part (90) and an imaging of the measurement object (1) is acquired by the imaging acquisition part (90).

According to the third exemplary embodiment of the present disclosure, as shown in FIG. 8, the apparatus (100) is configured to include the image-rotating prism (45) (dove prism) differently from the first and second exemplary embodiments. The reflective light transmitted through the third beam splitter (80) is incident on the image-rotating prism (45). The reflective light transmitted through the image-rotating prism (45) is incident on an angle-resolved spectral imaging acquisition part (40).

The image-rotating prism (45) emits an output reflective light which is rotated 2θ degrees from an input reflective light, as rotating e degrees about an optical axis.

In addition, the angle-resolved spectral imaging acquisition part (40) polarizes the reflective light transmitted through the image-rotating prism (45), in a back focal plane of the objective lens (30), allowing acquiring a polarized angle-resolved spectral imaging.

As shown in FIG. 10, if an angle of rotation of the image-rotating prism (45) is 45 degrees, an output imaging which is rotated 90 degrees is acquired.

Therefore, the angle-resolved spectral imaging acquisition part (40) acquires an s-polarized imaging or a p-polarized imaging according to an angle of rotation of the image-rotating prism (45). That is, the angle-resolved spectral imaging acquisition part (40) acquires the s-polarized imaging if an angle of rotation of the image-rotating prism (45) is 0 degrees, while acquiring the p-polarized imaging if an angle of rotation of the image-rotating prism (45) is 45 degrees.

Therefore, according to the third exemplary embodiment of the present disclosure, it is capable of acquiring both the s-polarized imaging and the p-polarized imaging using one angle-resolved spectral imaging acquisition part (40) by changing an angle of rotation of the image-rotating prism, In addition, an analysis means measures and analyzes the thickness and refractive index of the measurement object (1) from the imaging acquired from the imaging acquisition part (90), the s-polarized imaging acquired and the p-polarized imaging acquired from the angle-resolved spectral imaging acquisition part (40).

What is claimed is:

1. A method for measuring a thickness and refractive index of measurement object coated with a multilayer thin film, wherein
the method for measuring thickness and refractive index of a multilayer structure using angle-resolved spectroscopic reflectometry comprises steps of:

emitting light from a broad band light source of an illuminant optical module, wherein the illuminant optical module comprises:
  the broad band light source emitting light; and
  an illuminant optical system emitting light having an even light intensity distribution through the objective lens from light which is emitted from the broad band light source;
reflecting part of the light which is emitted from the illuminant optical module by a first beam splitter;
allowing the light reflected in the first beam splitter to be incident on the measurement object composed of a multilayer thin film through an objective lens;
reflecting part of the reflective light of the light incident on the measurement object by a third beam splitter, followed by allowing a reflective light reflected in the third beam splitter to be incident on an imaging acquisition part, so as to acquire an imaging of the measurement object;
allowing a reflective light transmitted through the third beam splitter to be incident on an image-rotating prism, followed by rotating an input reflective light according to rotation of the image-rotating prism about an optical axis, so as to emit an output reflective light; and
acquiring a first polarized angle-resolved spectral imaging or a second polarized angle-resolved spectral imaging by polarizing an output reflective light transmitted through the image-rotating prism;
wherein the acquiring the first polarized angle-resolved spectral imaging or the second polarized angle-resolved spectral imaging by polarizing the output reflective light transmitted through the image-rotating prism comprises:
  imaging, to a first slit, the reflective light reflected in the second beam splitter and located in the back focal plane of the objective lens;
  transmitting, by the first slit, only first polarized light in the reflective light in the back focal plane in the first imaging optical system; and
  acquiring, by a first imaging spectrometer, the first polarized angle-resolved spectral imaging or the second polarized angle-resolved spectral imaging.

2. The method for measuring a thickness and refractive index of measurement object coated with a multilayer thin film of claim 1,
  an analysis means measures and analyzes thickness and refractive index of the measurement object from the imaging acquired from the imaging acquisition part, the first polarized angle-resolved spectral imaging and the second polarized angle-resolved spectral imaging.

* * * * *